United States Patent
Kennerknecht

(10) Patent No.: US 9,914,596 B2
(45) Date of Patent: Mar. 13, 2018

(54) CONVEYING DEVICE

(71) Applicant: Liebherr-Verzahntechnik GmbH, Kempten (DE)

(72) Inventor: Wilhelm Kennerknecht, Immenstadt (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 15/437,917

(22) Filed: Feb. 21, 2017

(65) Prior Publication Data

US 2017/0240362 A1 Aug. 24, 2017

(30) Foreign Application Priority Data

Feb. 22, 2016 (DE) ........................ 10 2016 002 048

(51) Int. Cl.
  *B65G 47/88* (2006.01)
  *B65G 35/06* (2006.01)

(52) U.S. Cl.
  CPC ......... *B65G 47/8823* (2013.01); *B65G 35/06* (2013.01); *B65G 2201/0267* (2013.01); *B65G 2207/48* (2013.01)

(58) Field of Classification Search
  CPC .... B65G 47/26; B65G 47/88; B65G 47/8807; B65G 47/8815; B65G 47/8823; B65G 35/06; B65G 2201/0267; B65G 2207/48
  See application file for complete search history.

(56) References Cited

U.S. PATENT DOCUMENTS

| | | | | |
|---|---|---|---|---|
| 5,676,235 A | * | 10/1997 | Sam ..................... | B23Q 7/1426 193/35 A |
| 6,189,672 B1 | * | 2/2001 | Schut ..................... | B65G 1/08 193/35 A |
| 6,234,292 B1 | * | 5/2001 | Schut ..................... | B65G 13/075 193/35 A |
| 6,763,930 B2 | * | 7/2004 | Johnson ............... | B65G 47/266 193/35 A |
| 7,092,788 B2 | * | 8/2006 | Brixius ................. | B65G 35/06 198/465.1 |
| 2015/0021147 A1 | | 1/2015 | Ihrefors | |

FOREIGN PATENT DOCUMENTS

| | | |
|---|---|---|
| EP | 2 500 294 A1 | 9/2012 |
| JP | H06-271 059 A | 9/1994 |

* cited by examiner

*Primary Examiner* — Leslie A Nicholson, III
*Assistant Examiner* — Keith R Campbell
(74) *Attorney, Agent, or Firm* — Dilworth & Barrese, LLP

(57) ABSTRACT

A conveying device for transport of workpiece carriers from and to one or more machining stations, has a stationary conveyor track having at least one guide rail, with at least one stopping device provided for stopping the workpiece carrier. This stopping device is formed as a pivot lever that is integrated in the at least one guide rail and pivotable for stopping the workpiece carrier from a neutral position in which it is aligned with the guide rail, to a position pivoted outwardly out of the guide rail. A method of stopping a workpiece carrier is also provided.

11 Claims, 3 Drawing Sheets

CONVEYING DEVICE

BACKGROUND OF THE INVENTION

The invention relates to a conveying device for the transport of workpiece carriers in accordance with the description herein.

As a rule, workpiece carriers are conveyed in a conveying device from and to one or more machining stations. Such conveying devices comprise a stationary conveyor track having at least one guide rail for the workpiece carriers and typically also comprise a corresponding drive for moving the workpiece carriers onward. Instead of such a drive, however, an incline can also be provided so that the workpiece carriers are moved onward due to gravity. To be able to stop corresponding workpiece carriers, stopping devices are provided in the conveyor track. On a corresponding stopping of the workpiece carriers, the workpieces arranged thereon can be removed and supplied to the machining station, that is, for example, to a processing machine.

Such conveying devices are already known. So-called stopping fingers that are extendably supported in the guide rail are known as the stopping device there. A corresponding stopping finger is in the respect to be provided for stopping a workpiece carrier.

A plurality of workpiece carriers having workpieces to be correspondingly machined are, however, supplied in front of machining stations so that a row of workpiece carriers accumulates before a machining station. This can be seen as a kind of buffer that is caused by the fact that the machining stations have different clock times. As soon as a workpiece carrier is to be stopped directly in front of the machining station, the stop function is subjected to the demand to stop an individual workpiece carrier.

If, however, workpiece carriers from the accumulated row of workpiece carriers should be detected in a targeted manner and should then be supplied to the working station, for example, a singularization must be carried out. Such apparatus for singularizing workpiece carriers are also already known. Two stopping fingers have to be provided here, with the workpiece carriers being able to be stopped and/or backed up by an intervention of the respective stopping finger.

The known stopping fingers are typically designed such that they engage into the guide rail on a corresponding extension movement and stop the workpiece carriers transported there as an abutment. In this respect, the stopping fingers have to cover comparatively long extension distances. For safety reasons, they have to be completely extended out of the guide rail on returning into the starting position to achieve a sufficient spacing from the workpiece carrier. The stopping fingers can typically be lowered in the base of the guide rail. Due to the long travel paths, a comparatively slow response time can be realized to stop the workpiece carrier.

SUMMARY OF THE INVENTION

It is the object of the present invention to provide a conveying device for the transport of workpiece carriers in accordance with the description herein that allows a reliable, secure and fast stopping of workpiece carriers.

This object is achieved in accordance with the invention by a conveying device having the features herein. A conveying device is accordingly provided for the transport of workpiece carriers from and to one or more machining stations, wherein the conveying device has a stationary conveyor track having at least one guide rail for the workpiece carriers, and at least one stopping device is provided for stopping the workpiece carrier. In accordance with the invention, the stopping device is formed as a pivot lever that is integrated in the at least one guide rail and that is pivotable for stopping the workpiece carrier from a neutral position in which it is aligned with the guide rail into a position pivoted outwardly out of the guide rail.

The stopping, the singularization and also the guidance of the workpiece carriers is possible in a very simple and secure manner using such a conveying device. The conveying onward of the workpiece carrier can be prevented very efficiently and simply by the provision of a pivot lever integrated into the guide rail as a stopping device in that the pivot lever is pivoted by a small angle out of its neutral position such that it projects laterally out of the guide rail and stops the workpiece carrier. The stopping device can react very sensitively and fast overall due to this small pivot movement.

Preferred embodiments of the invention result from the description herein.

In accordance with an advantageous embodiment of the invention, the workpiece carrier has at least one guide groove corresponding to the at least one guide rail at its side facing the guide rail, wherein the at least one guide groove is regionally laterally broadened while forming a recess in order thus to form an abutment for the pivot lever pivoted outwardly out of the guide rail as required. An engagement into the workpiece carrier at the lower side and a corresponding stopping are hereby achieved. The risk of injury by, for example, a squeezing during the stopping procedure can be lowered by this design embodiment. Fewer stopping fingers than usual furthermore have to be provided.

It is of advantage if the region on the side facing the guide rail in which the recess is arranged comprises a replaceable, separate part. This part forms a wear part that can optionally be formed from a different, more wear-resistant material than the remaining workpiece carrier.

The workpiece carrier can advantageously be formed as a pallet or as an adapter plate. Pallets are pure transport carriers for workpieces in this connection. They are adapted to the transport systems in their type and properties. Such pallets convey the workpieces to a predefined position so that the workpieces can be removed while the pallets remain on the guide rail. Adapter plates in contrast are not only used for transport, but also represent a part of a processing machine. They are thus clamped in the machining station with the workpiece or workpieces located on them. While the workpieces are defined with respect to the design of their slide rails, clamping elements and assembly carriers, they have every design freedom with respect to the design at their lower side at which the advantageous recess is to be provided.

The size of the pivot lever can advantageously thereby be adapted in accordance with the weight of the workpiece carriers to be stopped in that its thickness that corresponds to the bridged length of the gap in the guide rail is varied. A longer section can thus be recessed in a very simple manner at the guide rail to form a pivot lever of thicker dimensions and said correspondingly thicker pivot lever engages into said section. The pivot lever can thereby be adapted very easily to the loading weight of the one or more workpiece carriers to be stopped.

A first sensor for detecting the approach of the workpiece carrier to the provided stop position can advantageously be provided via which an activation signal for outwardly pivoting the pivot lever can be activated.

The reaching of a desired stop position of the workpiece carrier can advantageously be checked via a second sensor.

A third sensor can be provided in accordance with a further preferred embodiment. In this embodiment, the first sensor again serves to activate the pivot lever. The second sensor serves the precise positioning of the workpiece carrier while the third sensor acts as a monitoring sensor.

At least one of the aforesaid sensors can particularly suitably be configured as a light barrier.

A subject of the invention is also a method of stopping a workpiece carrier in a conveying device of the aforesaid kind, wherein the position of the workpiece carrier is determined via at least one sensor, and wherein the pivot lever is selectively controlled in dependence on the received sensor signals when the workpiece carrier is to be stopped. A secure and reliable stopping of the workpiece carrier is achieved by this method.

BRIEF DESCRIPTION OF THE DRAWINGS

Further features, details and advantages of the invention result from the following description of a preferred embodiment of the present invention shown in the drawing.

There are shown.

DESCRIPTION OF THE PREFERRED EMBODIMENTS

Figure 1:
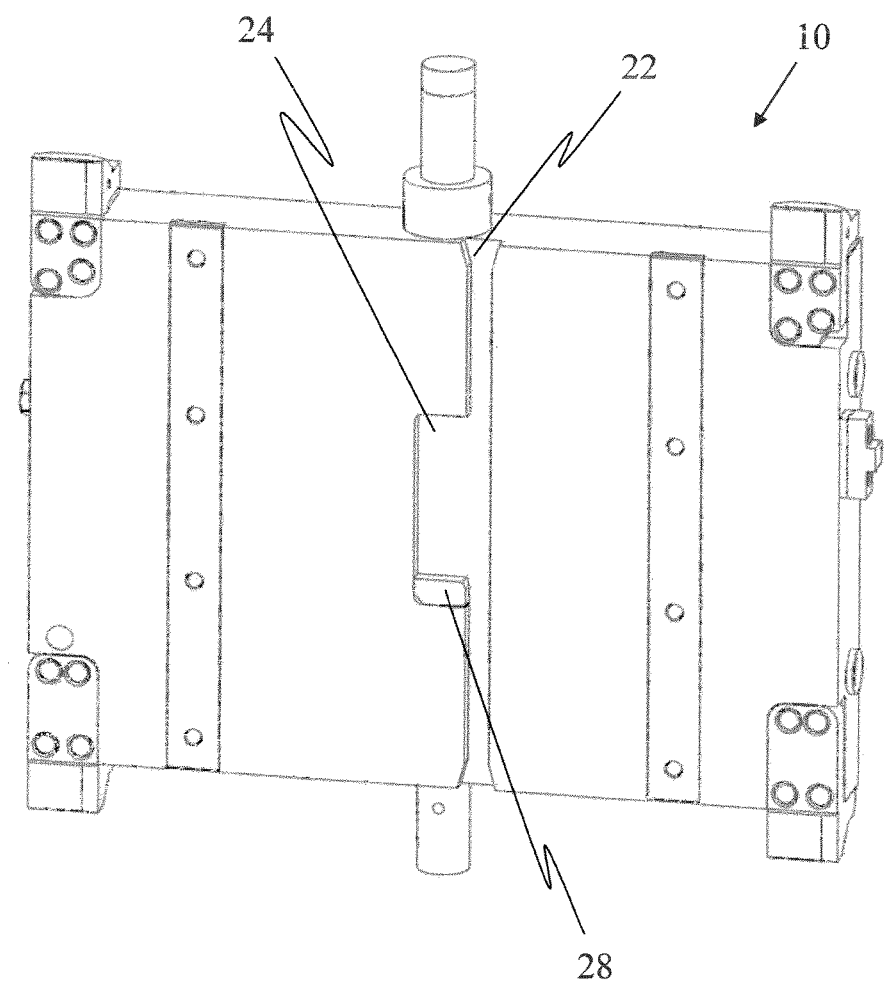
FIG. 1: a perspective view of an embodiment of a workpiece carrier for a conveying device in accordance with the invention.
Figure 2:
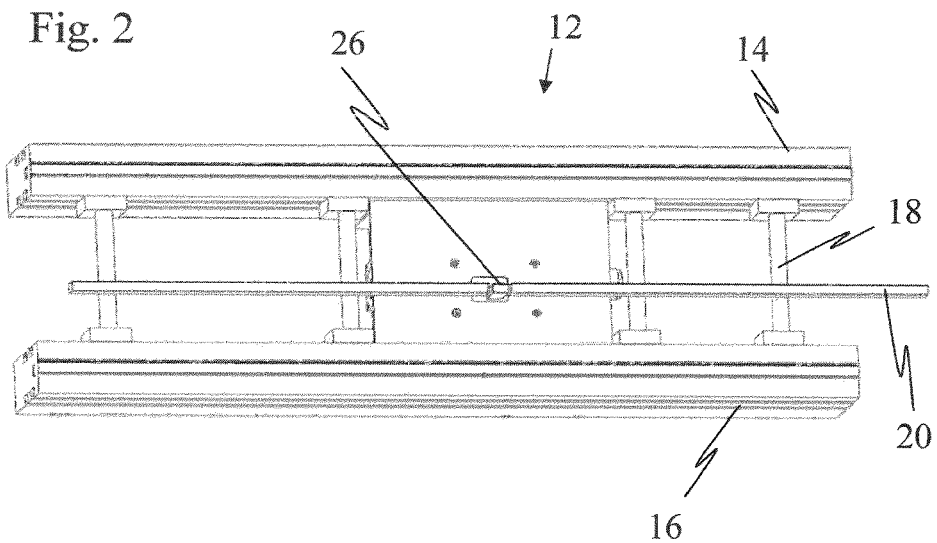
FIG. 2: a perspective view of a conveyor track with an inactive stopping device.
Figure 3:
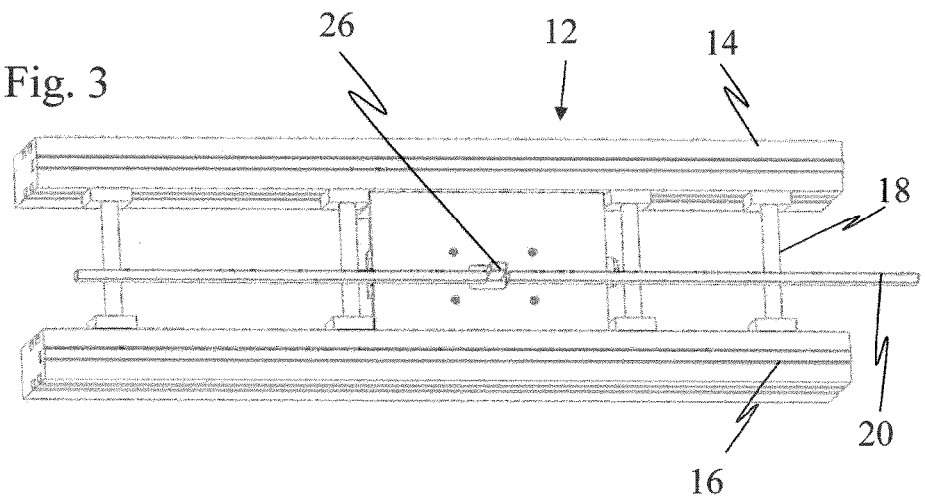
FIG. 3: a perspective view in accordance with FIG. 2 of a conveyor track with a stopping device after its activation.
Figure 3A:
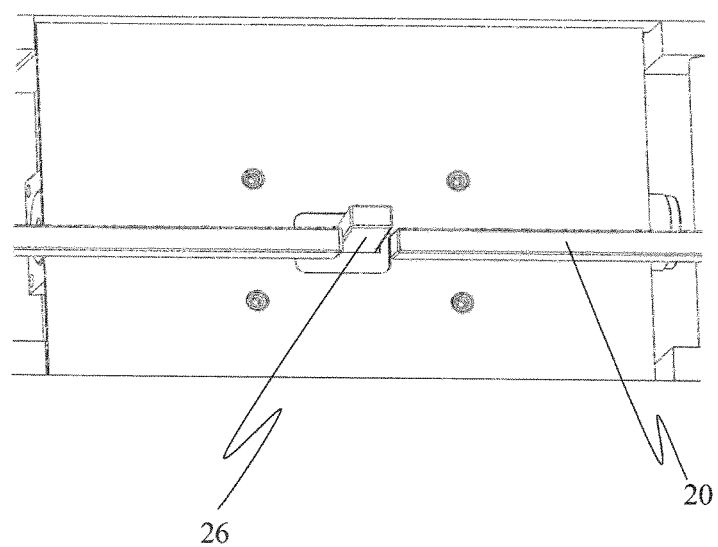
FIG. 3a: an enlarged representation of FIG. 3.

A preferred embodiment of the conveying device in accordance with the invention is shown in the Figures. FIGS. 1 to 3a here show respective parts of the conveying device. While a workpiece carrier 10 of customary design is shown in FIG. 1, respective representations of one and the same conveyor track 12 are shown in FIGS. 2, 3 and 3a on which a corresponding workpiece carrier 10 runs (not shown here).

The conveyor track 12 has two respective lateral side wall parts 14 and 16 that are connected to one another by transverse struts 18. A guide rail 20 extends approximately centrally between the corresponding side wall parts 14 and 16 in the embodiment shown here. The workpiece carrier 10 in accordance with FIG. 1 is conveyed along the conveyor track 12 by a drive apparatus, not shown in any more detail here. The workpiece carrier has a guide groove 22 arranged at its side facing the guide rail 20 for guidance. This guide groove 22 therefore surrounds the guide rail 20 of the conveyor track 12 in the assembled state. A reliable and secure guidance of the workpiece carrier 10 on the guide rail 20 of the conveyor track 12 is ensured by means of the guide groove 22. In the assembled state, the guide rail 20 thus extends beneath the workpiece carrier 10. The workpiece carrier 10 is thus accessible from three sides, which produces a much improved operation or handling.

The guidance of the workpiece carrier at the outer sides is no longer necessary since it is completely replaced with the almost centrally arranged guide rail 20. The workpiece carrier 10 is thus freely accessible from all sides by the replacement of lateral guide elements and provides a simplified handling of the workpiece carrier or of the workpiece carried by it. This can be gripped substantially more easily, for example by means of a gripper. In addition, at least one laterally attached data carrier with data relevant to the workpiece and/or to the workpiece machining can, for example, be attached to the workpiece carrier 10 in a simple manner. This is not shown in the illustration. Clamping elements, likewise not shown in any more detail, can also be arranged as desired at the side.

The guide groove 22 of the workpiece carrier 10 has a recess 24 that laterally broadens the guide groove 22 in the manner shown in FIG. 1. An abutment for a corresponding stopping element at the guide track side is hereby formed. The corresponding stopping element comprises a pivot lever 26 pivotably arranged in the conveyor track 12. This pivot lever 26 is connected to a pivot mechanism that allows a slight deflection of the pivot lever 26 aligned with the guide rail 20 in its neutral position.

The pivot lever 26 is shown in its neutral position in FIG. 2, i.e. in the position aligned with the guide rail 20. The pivot lever 26 is in contrast shown in its deflected position in FIG. 3 in which it comes to lie next to the guide rail. In this position, the pivot lever 26 would engage into a corresponding recess 24 of the workpiece carrier 10 that naturally has to be guided on the conveyor track 12 for this purpose. The deflected pivot lever 26 would abut an abutment 28 in the recess 24 in accordance with the positioning in FIG. 3. FIG. 3a shows an enlarged representation of the pivot lever 26 in the outwardly pivoted position in accordance with FIG. 3.

To avoid any damage by the engagement of the pivot lever 26, a replaceable part 28 from a wear-resistant material is arranged in the cut-out 24. Instead of this insert 28, the total region 24 can also consist of a corresponding material and be used. The replaceable part 28 can be fastened in any desired manner. Different joining methods are conceivable for this purpose, for example a bonding, welding, brazing and/or screwing.

As can be seen from FIGS. 2 and 3, the pivot lever 26 is deflected by such a small distance that only a very small gap arises. The gap is in this respect dimensioned so small that a possible crushing of the hand or of a finger of the operator can be reliably prevented.

The pivot lever 26 can also be manufactured from a particularly strong material. It can differ in strength from the remaining material the guide rail 20 comprises.

An incorrect operation can be largely prevented by the simple stop function by the pivot lever due to the simple structure. Due to the two pivot possibilities, there is only the distinguishing of two positions, namely the conveying position in accordance with FIG. 2 and the blocking position in accordance with FIG. 3.

An embodiment with a guide rail 20 is shown in the present embodiment example here. Instead of this design, however, an embodiment is also conceivable that has two parallel guide rails 20. Heavy workpiece carriers 10 can also be reliably stopped by means of a respective pivot lever 26 fastened to these guide rails 20. Two guide rails are in particular also provided when a central arrangement of a guide rail 20 is not possible and/or when particularly heavy workpiece carriers 10 are used.

A lateral guidance at one side is also possible depending on the area of use. A guide rail can, however, also be configured as a cover or as a protective rail to screen the pivot lever 26.

The invention claimed is:

1. A conveying device for the transport of workpiece carriers from and to one or more machining stations, comprising
    a stationary conveyor track (12) having outer sidewalls (14, 16) arranged to support the workpiece carriers and a guide rail (20) extending approximately centrally between the sidewalls (14, 16) for at least one of the workpiece carriers (10) and extending beneath the at least one workpiece carrier (10),
    a guide groove (22) situated along an underside of the at least one workpiece carrier (10) and arranged to mate with and surround the guide rail (20),
    said guide groove (22) comprising a laterally-extending recess (24) forming an abutment,
    at least one stopping device (26) for stopping the at least one workpiece carrier (10), and
    formed as a pivot lever (26) integrated in the guide rail (20) and pivotable for stopping the at least one workpiece carrier (10) from a neutral position aligned with the guide rail (20) into a position pivoted outwardly of the guide rail (20) to contact an edge of the laterally-extending abutment (24) of the at least one workpiece carrier (10) formed as a stop (28),
    with the centrally-positioned guide rail (20) guiding the at least one workpiece carrier along the track (12) and the outer sidewalls (14, 16) not guiding the at least one workpiece carrier (10).

2. A conveying device in accordance with claim 1, wherein the at least one workpiece carrier comprises on a side facing the guide rail a replaceable separate part.

3. A conveying device in accordance with claim 2, wherein the replaceable part comprises a wear-resistant material.

4. A conveying device in accordance with claim 1, wherein the at least one workpiece carrier is configured as a pallet or an adapter plate.

5. A conveying device in accordance with claim 1, wherein the size of the pivot lever is configured in accordance with the weight of the at least one workpiece carrier to be stopped in that the pivot lever comprises varying thickness.

6. A conveying device in accordance with claim 1, wherein a first sensor is provided for detecting the approach of the at least one workpiece carrier to the provided stopping position and an activation signal for outwardly pivoting the pivot lever is activated via the first sensor.

7. A conveying device in accordance with claim 1, wherein a sensor is provided for monitoring the reaching of a desired stopping position of the at least one workpiece carrier.

8. A conveying device in accordance with claim 6, wherein the first sensor is configured as a light barrier.

9. A conveying device in accordance with claim 1, wherein the lever (26) pivots in the lateral direction to the guide rail (20).

10. A conveying device in accordance with claim 7, comprising an additional sensor for precise positioning of the workpiece carrier (10).

11. A method of stopping a workpiece carrier in a conveying device, comprising the steps of
    supporting the workpiece carrier (10) on a stationary conveyor track (12) having outer sidewalls (14, 16),
    guiding the workpiece carrier (10) along a rail (20) extending beneath the workpiece carrier (10) and approximately centrally between the sidewalls (14, 16),
    mating the workpiece carrier (10) with the guide rail (20) through a guide groove (22) situated along an underside of the workpiece carrier 910),
    determining position of the workpiece carrier (10) via at least one sensor,
    pivoting a lever (26) integrated in the guide rail (20) to contact an edge of a laterally-extending abutment (24) in the guide groove (22), and
    selectively controlling the pivoting lever (26) in dependence on received sensor signals from the at least one sensor when the workpiece carrier (10) is to be stopped.

* * * * *